United States Patent [19]

Rome, Sr. et al.

[11] 4,083,230
[45] Apr. 11, 1978

[54] TUBING TESTING TOOL

[75] Inventors: Daniel J. Rome, Sr.; Salvador P. LaRussa, both of Houma, La.

[73] Assignee: Romco Pipe Testing, Inc., Houma, La.

[21] Appl. No.: 765,407

[22] Filed: Feb. 3, 1977

[51] Int. Cl.² ............................................. G01M 3/08
[52] U.S. Cl. .................................................. 73/40.5 R
[58] Field of Search .................. 73/40.5 R, 155, 49.1, 73/49.5, 151

[56] References Cited

U.S. PATENT DOCUMENTS 2,767,795  10/1956  Bush ................................. 73/40.5 R Primary Examiner—Jerry W. Myracle
Attorney, Agent, or Firm—Clarence A. O'Brien; Harvey B. Jacobson

[57] ABSTRACT

A tool for testing tubing, well casing, pipe or other flow conductors including longitudinally spaced sealers or packers which can be expanded to isolate a portion of the tubing string for subjecting the isolated portion to test pressure supplied to the isolated portion through flow controllers which include a fluid diffuser which prevents direct impingement of the testing fluid onto the inside coating on the tubing, thus preserving the integrity of the coating. The spaced sealers are expanded by piston and cylinder assemblies constructed and arranged so that the tool does not move when in operation, that is, it does not change in length in order to compress the sealers. The tool includes a head enabling it to be utilized inside the tubing or above the tubing and a foot or lower end provided with a swab which precludes testing fluid from going "downhole" and contaminating the "mud", thereby enabling the same testing fluid to be continuously reused.

14 Claims, 13 Drawing Figures

TUBING TESTING TOOL

BACKGROUND OF THE INVENTION

1. Field of the Invention

The present invention generally relates to a tool for testing tubing, well casing, pipe, or other flow conductors having spaced sealers or packers expanded by movable cylinders associated with a shaft which forms a piston in which the over-all length of the tool remains unchanged during compression and expansion of the sealers and release of the compression and retraction thereof, together with a unique arrangement for preventing direction impingement of testing fluid onto the inner coating on tubing, and the like, and a swab structure which precludes the testing fluid from running down the tubing or pipe as the tool is being moved from one position to another in the tubing.

2. Description of the Prior Art

Pressure testing of tubing, casing, pipe, or flow conductors to determine the presence of leaks is well known. For example, when making up a tubing string as it is lowered into a well bore, it is a well known technique to pressure test the tubing string, particularly the joints between adjacent sections, for leaks by isolating a portion of the tubing string by expanding spaced packers and then subjecting the isolated portion to high pressure fluid with any leaks being detected by monitoring the pressure of the test fluid. The testing tool is normally supported from a cable connected with a draw works for raising and lowering the tool and a conduit is connected to the tool for supplying fluid pressure to expand the packers and convey test fluid to the isolated annular space between the packers. The following U.S. patents illustrate exemplary developments in the art of pressure testing tubing for leaks.

U.S. Pat. Nos:
  2,715,444—Aug. 16, 1955
  2,793,524—May 28, 1957
  2,998,721—Sept. 5, 1961
  3,059,699—Oct. 23, 1962
  3,165,918—Jan. 19, 1965
  3,165,919—Jan. 19, 1965
  3,165,920—Jan. 19, 1965
  3,199,598—Aug. 10, 1965
  3,436,957—Apr. 8, 1969
  3,495,443—Feb. 17, 1970
  3,899,920—Aug. 19, 1975.

SUMMARY OF THE INVENTION

An object of the present invention is to provide a tool for pressure testing tubing, casing, pipe, or other flow conductors, in order to detect any leaks which may exist therein and which includes upper and lower sealers or packers which are compressed and expanded by movable cylinders mounted on a continuous shaft assembly whereby the tool remains static in length, that is, it does not pull apart or compress when operating.

Another object of the invention is to provide a testing tool which includes a swab on the lower end portion thereof to prevent testing fluid from escaping downhole.

A further object of the invention is to provide a testing tool in which the fluid pressure which causes compression and expansion of the sealers is also used as the testing fluid with uniquely constructed flow controllers being provided to control the flow of testing fluid so that the sealers are expanded and set prior to discharge of testing fluid into the isolated annular space between the sealers with the flow controllers also including a unique diffuser structure which prevents direct impingement of the testing fluid onto the coated interior surface of the tubing, casing, pipe, flow conductor, or the like, thereby preventing erosion of the coating.

A further object of the invention is to provide a testing tool having rubber protectors thereon to facilitate changeout of the protectors without the use of special equipment and a tool head that may be utilized both inside the tubing or above the tubing which will save time in the testing of pipe, since the standard method employed by present testing tools is to change the type of devices on the top of the tool.

Still another important object of the present invention is to provide a testing tool, in accordance with all of the preceding objects, which is relatively simple in construction since it is provided with only two moving parts and the tool is completely devoid of springs, ball valve seats, needle valves, and the like, all of which are subject to failure or other functioning problems during operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an elevational view of the testing tool of the present invention installed in a tubing string, or the like.

FIG. 12 is an exploded, group, perspective view of the tool head illustrating the relationship of the bail, tubing connector and body.

FIG. 13 is an exploded, perspective view of one of the expandable sealers and its associated packer shaft and flow controller and cylinder.

DESCRIPTION OF THE PREFERRED EMBODIMENT

Figure 1:
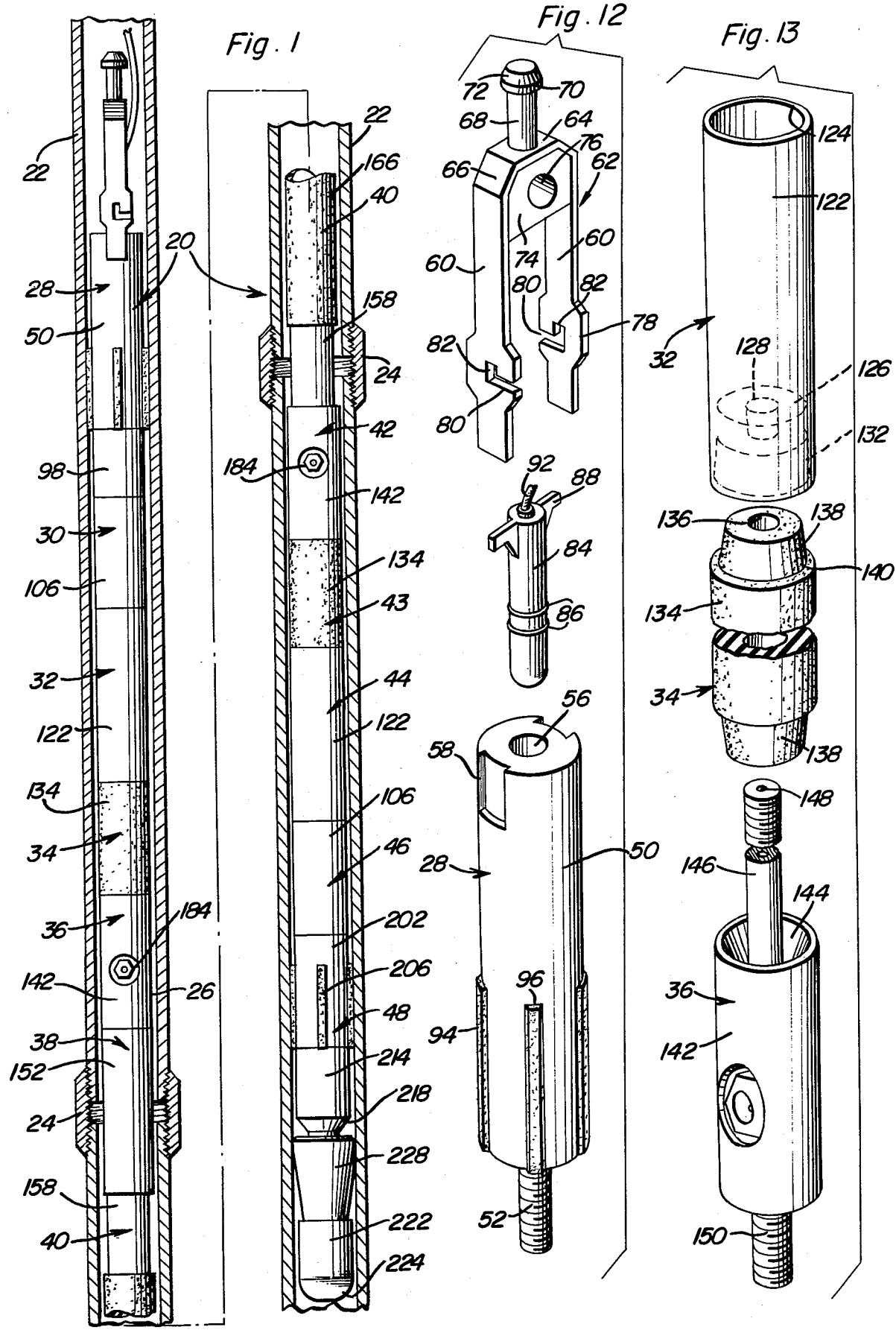
Figure 2:
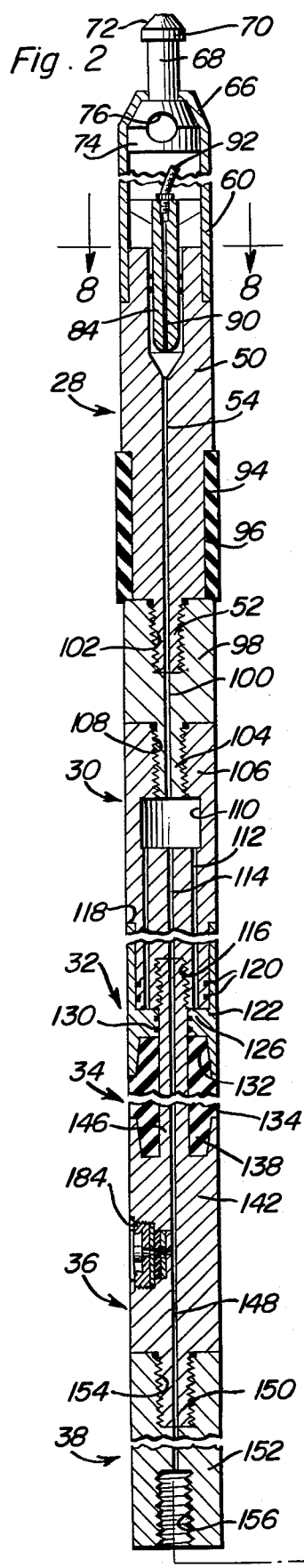
FIGS. 2, 3 and 4 are sectional views of the upper end portion, the central portion or extension and the lower end portion of the tool, respectively.
Figure 3:
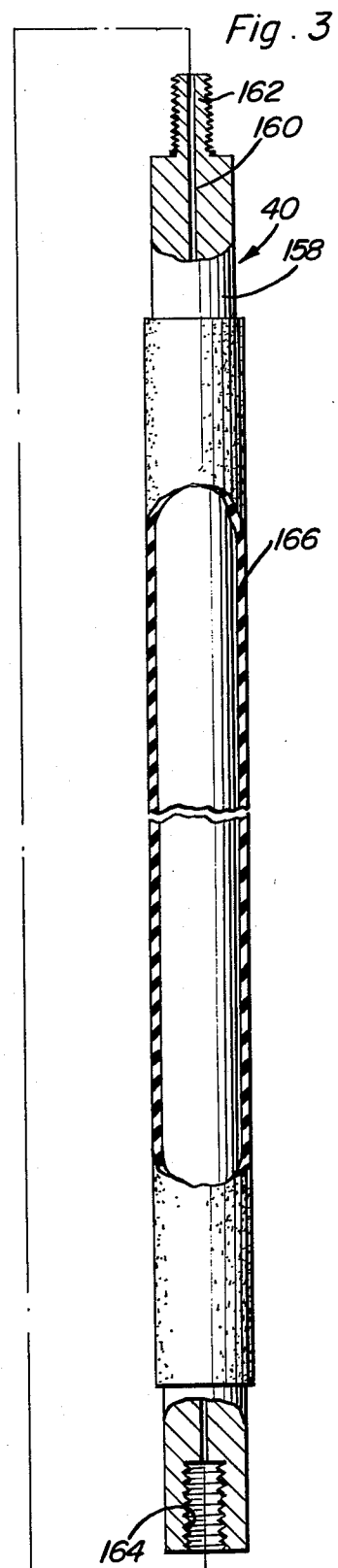
Figure 4:
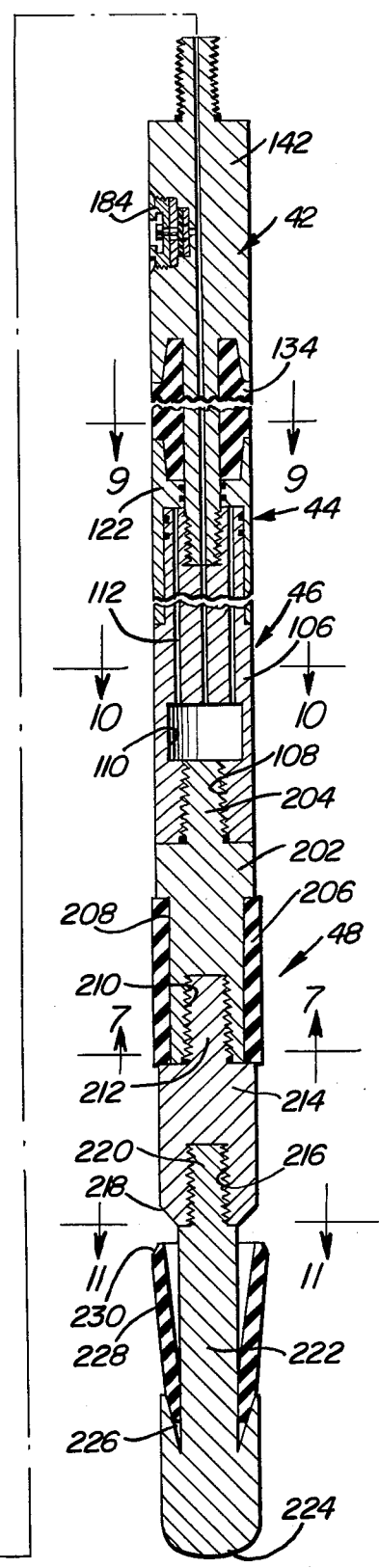

Referring now specifically to the drawings, the tubing testing tool of the present invention is generally designated by reference numeral 20 and is associated with a tubing string 22 which includes threaded connections, couplings, collars, or the like, designated by numeral 24 for the purpose of testing the tubing string 22 by isolating an annular test space 26 between the external surface of the tool 20 and the coated internal surface of the tubing string 22. The testing tool 20 includes, from top to bottom, a tool head generally designated by numeral 28, a top cylinder shaft generally designated by numeral 30, a top cylinder generally designated by numeral 32, a top rubber sealer generally designated by numeral 34, a top packer shaft and flow controller generally designated by numeral 36 and a connector stub generally designated by numeral 38 for connecting the top assembly to an elongated extension generally designated by numeral 40 which is of selected length. The lower portion of the tool below the extension includes a bottom packer shaft and flow controller generally designated by numeral 42, a bottom sealer 43, a bottom cylinder generally designated by numeral 44, a bottom cylinder shaft generally designated by numeral 46 and a tool foot generally designated by numeral 48. FIG. 2 illustrates the specific structure of the upper end portion of the tool, FIG. 3 illustrates the extension 40 and FIG. 4 illustrates the lower end portion of the tool.

Referring now specifically to FIGS. 2 and 12, the tool head 28 includes a generally cylindrical body 50 having a lower end provided with a depending threaded shaft 52 unitary therewith of substantially less cross-sectional dimension. A longitudinal passageway 54 extends through the body and the upper end of the passageway is enlarged to define a bore 56 extending inwardly from the upper end of the body 50. The upper end of the outer surface of the body 50 is provided with a pair of longitudinally extending notches 58 which receive and rigidly attach the lower ends of the legs 60 of a generally inverted U-shaped bail 62 having the upper end thereof formed by a bight portion 64 with the juncture between the legs 60 and the bight 64 being inclined or angulated as at 66. Projecting upwardly from the bight portion 64 is a shank 68 having a large head 70 thereon with the upper corner of the head 70 which is circular in configuration being chamfered or beveled at 72 which enables the use of a standard grappling device to be connected to the tool. Also, the upper portion of the bail 62 is provided with a block 74 which fills the upper portion of the bail 62 and is rigid therewith and provided with an aperture 76 extending therethrough adapted to receive a cable to raise and lower the tool thereby enabling this tool to be used either with a standard grappling device or cable for raising and lowering the tool.

The lower end portion of each of the legs 60 is provided with an enlarged area 78 provided with an inwardly extending, generally horizontal slot 80 which terminates at its inner end in a longitudinally, upwardly extending slot 82. The slot 80 in one leg opens in one direction while the slot 80 in the other leg opens in the other direction as illustrated in FIG. 12 for engagement with a tubing connector 84 which is a cylindrical member telescopically inserted into the bore 56 in the body 50 and provided with a pair of O-rings 86 thereon for sealing engagement with the wall of the bore 56. The upper end of the tubing connector 84 is provided with a pair of laterally extending wings or lugs 88 which are receivable in the slots 80 and 82 thereby enabling the tubing connector to be separated from the bail and body 50 by moving the tubing connector 84 and the lugs 88 thereon in an axial and rotatable manner. Also, the tubing connector 84 includes a passageway 90 therethrough and the upper end of the passageway 90 is connected to a conduit, such as a flexible hose 92, or the like, in a conventional manner, thereby providing fluid pressure to the tool through the hose 92, passageway 90 and passageway 54.

Figure 7:
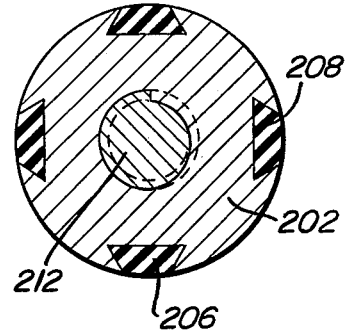
FIG. 7 is a transverse, sectional view taken substantially upon a plane passing along section line 7—7 of FIG. 4 illustrating the construction of the body and rubber protectors.
Figure 8:
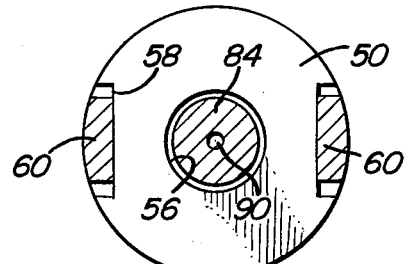
FIG. 8 is a transverse, sectional view taken substantially upon a plane passing along section line 8—8 of FIG. 2 illustrating the manner in which the bail is connected to the tool head body.
Figure 9:
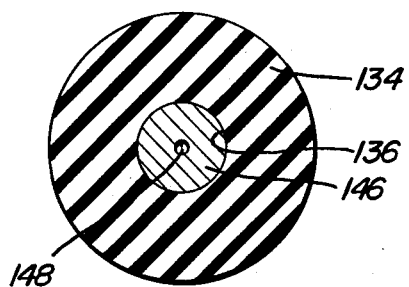
FIG. 9 is a transverse, sectional view taken substantially upon a plane passing along section line 9—9 of FIG. 4 illustrating the construction of one of the compressible and expandable sealers.

The external surface of the body 50 is provided with a plurality of circumferentially spaced rubber protectors 94 which are in the form of longitudinal strips of rubber of wedge-shaped configuration, see FIG. 7, which are received in corresponding notches 96 in the body 50. The rubber protectors 94 are retained in the notches 96 by a rubber retainer 98 which is in the form of a cylindrical member having the same diameter as the body 50 and threaded onto the shaft 52 with the rubber retainer including a passageway 100 and a screw threaded socket or recess 102 in the upper end and a depending screw threaded shaft 104 at the other end thereof, as illustrated in FIG. 2, and which completes the tool head with the rubber protectors 94 serving to protect the inside of the tubing or pipe being tested.

The top cylinder shaft 30 includes an enlongated cylindrical shaft or body 106 having a threaded socket 108 in screw threaded engagement with the shaft 104 on the rubber retainer 98 with the socket 108 communicating with a cavity 110 that is in communication with the passageway 100 at one end thereof and at the other end, the cavity 110 is in communication with a plurality of circumferentially spaced passageways 112 which are spaced from the center of the shaft 106 and the cavity 110 is also in communication with a central passageway 114 which is generally in alignment with the passageway 100. The lower end of the shaft or body 106 includes a threaded socket 116 communicating with the central passageway 114 and the external surface of the lower end of the shaft or body 106 is provided with a peripheral recess 118 and the recess 118 is provided with a pair of O-ring seals 120 adjacent to the lower end thereof and the lower end of the shaft or body 106 has the circumferentially spaced passageways 112 communicating therewith.

The top cylinder 32 includes a cylindrical body 122 having a large internal cylindrical bore 124 communicating with the upper end thereof and telescopically received on the recess 118 on the shaft or body 106 of the top cylinder shaft 30, as illustrated in FIG. 2. The O-ring seals 120 engage the interior of the bore 124 of the cylindrical body 122, thus forming a seal therebetween and enabling relative longitudinal movement of the cylinder 32. The lower end portion of the body 122 includes a partition wall 126 having a central aperture 128 therein and O-ring seals 130 on the interior of the aperture 128. The lower end of the body 122 has a bore 132 which is downwardly and outwardly flared on its inner surface, as illustrated in FIG. 2.

Disposed below the top cylinder 32 is the top rubber sealer 34 which is in the form of a generally cylindrical body of compressible, resilient rubber material designated by numeral 134 and which includes a central bore 136 extending therethrough with each end of the body 134 including a generally frusto-conical axial extension 138 which forms a shoulder 140 where it joins with the cylindrical body 134. The axial extension 138 is shaped in a manner to be telescopically received within the similarly shaped frusto-conical bore 132 in the bottom of the cylinder 32 as illustrated in FIG. 2.

Positioned below the top rubber sealer 34 is the top packer shaft and flow controller generally designated by numeral 36 and which includes a cylindrical body 142 having a frusto-conical cavity or bore 144 in the upper end thereof of a shape similar to the bore 132 and telescopically receiving and seating the lower end extension 138 on the sealer body 134. Extending vertically from the body 142 is a shaft 146 which extends completely upwardly through the sealer body 134 and also through the aperture 128 in the wall 126 in the cylindrical body 122 with the upper end of the shaft 146 being threaded into the internally threaded socket 116 in the bottom end of the top cylinder shaft 30, thus securely locking the top cylinder shaft 30 rigidly to the top packer shaft and flow controller 36 with the top cylinder 32 being movable longitudinally on the shaft 146 with the O-rings 130 serving to seal the sliding connection between the shaft 146 and the aperture 128 in the wall 126 and the O-rings 120 serving to seal the sliding engagement between the interior of the bore 124 and the exterior of the recess 118 on the top cylinder shaft 30 so that pressure discharged through the passageways 112 will force the top cylinder 32 downwardly in relation to the sealer 34 thereby compressing and expanding the resilient sealer body 134 into sealing engagement with the interior of the tubing string thereby sealing or packing-off the tubing string to be tested above the joint 24 and defining the upper limit of the isolated portion of the tubing string and also defining the upper end of the test space 26.

The body 142 and also the shaft 146 is provided with a passageway 148 extending therethrough which is in alignment with and communication with the passageway 114 and the lower end of the body or shaft 142 is provided with an externally threaded shaft 150 which is in screw threaded engagement with the connecting stub 38 which is in the form of a cylindrical body 152 having an internally threaded socket 154 in the upper end thereof and an internally threaded socket 156 in the lower end thereof as illustrated in FIG. 2.

As illustrated in FIG. 3, the extension 40 includes an elongated body or shaft 158 of cylindrical construction of indeterminate length provided with a passageway 160 throughout the length thereof and provided with an externally threaded shaft 162 at the upper end thereof and an internally threaded socket 164 at the lower end thereof. The external surface of the major portion of the extension body or shaft 158 is provided with a rubber protector 166 in the form of a covering for the external surface of substantially the entire length of the extension 40.

Figure 5:
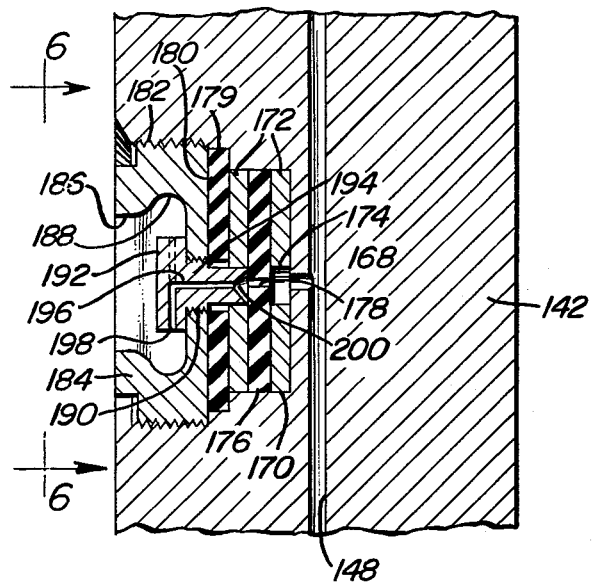
FIG. 5 is a fragmental, enlarged, sectional view of one of the flow controllers.
Figure 6:
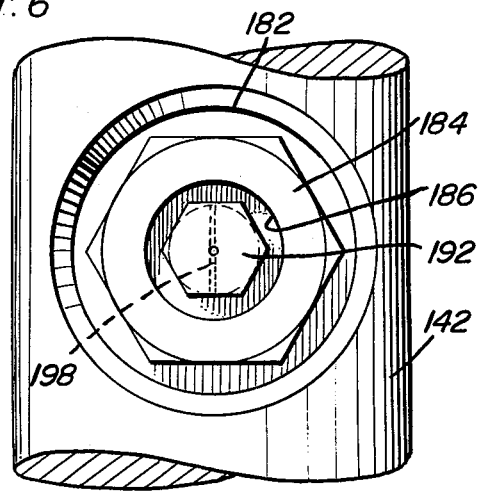
FIG. 6 is an elevational view of the discharge end of the flow controller taken along reference line 6—6 of FIG. 5 illustrating the construction of the diffuser.
Figure 10:
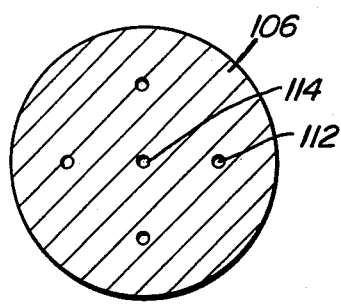
FIG. 10 is a transverse, sectional view taken substantially upon a plane passing along section line 10—10 of FIG. 4 illustrating the passageways in the cylinder shaft.
Figure 11:
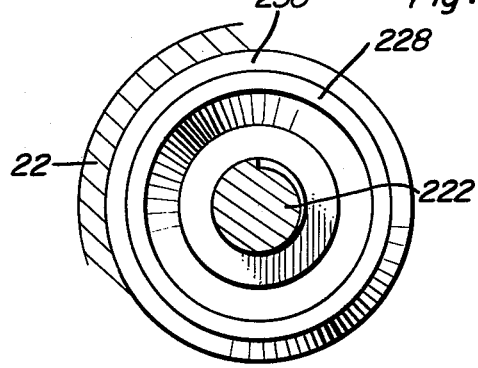
FIG. 11 is a transverse, sectional view taken substantially upon a plane passing along section line 11—11 of FIG. 4 illustrating the construction of the tool foot and swab thereon.

The top packer shaft and flow controller 36 includes a structure for discharging pressurized fluid from the passageway 148 to the test space 26. This structure is illustrated in detail in FIGS. 5 and 6 and includes a small lateral passageway 168 in the body or shaft 142 communicating with the central passageway 148. The small lateral passageway 168 communicates with a substantially larger bore 170 which receives a pair of annular metal washers 172 each of which is provided with a central aperture 174 larger than the passageway 168 and in alignment with the passageway 168. Interposed between the two washers 172 is a flow controller 176 in the form of a rubber washer having a central orifice 178 of a dimension smaller than the apertures 174 or the passageway 168. Disposed outwardly of the bore 170 is a slightly larger bore 179 which receives a rubber washer 180 therein which rests against the outer metal washer 172. Disposed outwardly of the bore 178 is a threaded bore 182 which receives an externally threaded retaining nut and diffuser 184 which has its inner end butted against and securing the rubber washer 180 in position which in turn secures the washers 172 and 176 in assembled relation. The retaining nut and diffuser 184 is provided with a generally cylindrical hollow interior 186 with an annular undercut chamber 188 communicating therewith and a central threaded aperture 190 in alignment with a central aperture in the rubber washer 180 and the central aperture 174 in the outer metal washer 172 with the threaded aperture 190 threadedly receiving a flow director 192 which has an externally threaded shank 194 integral therewith provided with a passageway 196 extending longitudinally therethrough and terminating in lateral passageways 198 communicating therewith and directed diametrically toward the undercut chamber 188, as illustrated in FIG. 5. The inner end of the passageway 196 is funnel-shaped, as at 200, for receiving pressurized fluid from the orifice 178 in the flow controller rubber washer 176 so that pressurized fluid will flow through the passageway 168, aperture 174 in the inner washer 172, the orifice 178 in the flow controller 176, the funnel-shaped end 200 on the passageway 196 and then through the lateral passageways 198 into the undercut chamber 188 which diffuses and reduces velocity of the pressurized fluid so that the fluid then will be discharged at a low velocity and in a swirling manner through the annular opening 186 in the retaining nut and diffuser 184 thereby precluding direct impingement of high pressure fluid onto the interior coating of the tubing string in the test space 26.

As indicated previously, the extension 40 is made in various lengths so that the top and bottom portions of the tool may be separated so that as many as three joints of tubing can be tested simultaneously. However, in some instances, the extension may be shorter for testing only a single joint. In any event, the lower portion of the tool as illustrated in FIG. 4 includes the same components as the upper portion, except for the tool head and except that the components are in reverse orientation. The bottom packer shaft and flow controller 42 is inverted in relation to the top packer shaft and flow controller 36 and is connected directly to the threaded socket 164 on the lower end of the extension 40 and the bottom rubber sealer 43 is associated with the bottom cylinder 44 and the bottom cylinder shaft 46 in the same manner as in the upper portion of the tool, except these components are also inverted. The structure illustrated in the bottom portion of the tool is designated by the same reference numerals as the top portion thereof with the identicalness of the structure of the lower portion terminating at the lower end of the bottom cylinder shaft 46.

Attached to the bottom cylinder shaft 46 is a tool foot generally designated by the numeral 48 and which includes a cylindrical body or shaft 202 having an upwardly extending externally threaded shaft 204 in threaded engagement with the downwardly opening socket 108 with the shaft 204 being solid and forming a closure for the bottom of the cavity 110. The body or shaft 202 is provided with a plurality of circumferentially spaced rubber protectors 206 received in grooves 208 with the rubber protectors being of wedge-shaped construction and the grooves 208 being similarly shaped as illustrated in FIG. 7. This structure is quite similar to the rubber protectors 94 and grooves 96 in the body 50 of the tool head. The lower end of the body or shaft 202 is provided with an internally threaded socket 210 receiving the externally threaded shaft 212 on a rubber protector retainer 214 which has a diameter sufficient to engage the bottom end of the rubber protectors 206, as illustrated in FIG. 4. The lower end of the rubber retainer 214 is provided with an internally threaded socket 216 and a chamfered outer corner 218. Socket 16 receives the externally threaded upper end portion 220 of a swab shaft 222 which has a generally rounded lower end 224 and a generally V-shaped, inclined recess 226 disposed upwardly from the rounded lower end and receiving a resilient swab 228 that is generally conical in configuration and provided with an upper edge 230 having a diameter larger than the tool so that it will contact the surface of the tubing string 22 and prevent flow of the test fluid downhole when the lower sealer is retracted. The integral swab will enable the same fluid to be continuously reused for pressure testing thereby reducing the time between each tool operation due to the time saving in not continually filling the void areas. Thus, the swab not only prevents contamination of the "mud" but also conserves the testing fluid and reduces the time necessary for each test operation.

In operation, the tool is lowered into the pipe or tubing to be tested and positioned at the desired location, after which pressure is applied. The flow control device produces a back pressure due to the action of the small orifice 178 in the rubber washer or disk 176. This back pressure causes the top and bottom cylinders 32 and 44 to compress the rubber sealers 34 and 43, thus isolating the test space and the parts of the pipe or tubing to be pressure tested. As the pressure is increased, the rubber disk 176 will be distended outwardly slightly and the orifice 178 allows the fluid to enter the test space through the flow diverter 192 so that pressure is built up on the pipe as well as additional pressure being built up on the top and bottom rubber sealers. After the desired pressure is reached for testing, the test pressure is monitored to detect leaks and after the testing operation has been completed, the pressure is released with the flow controller 176 allowing the fluid to reenter the tool in a reverse direction and the rubber sealers returning the top and bottom cylinders to their original positions. The swab, which is an integral part of the tool foot, precludes any fluid from going "downhole" and when the tool is pulled from the pipe, all fluid used for testing is brought out of the pipe.

The flow director and combination retaining plug and diffuser act to preclude the direct impingement of fluid on the inside surface of the pipe being tested. The flow director 192 turns the flow of fluid 90° into the diffuser chamber 188, which allows the fluid to exit the tool in a swirling action. This arrangement is quite unique as it effectively protects the inside coating of the pipe from erosion due to direct impingement of the pressure fluid thereon, thus prolonging the useful life of the pipe by preserving the coating thereon. Also, the tool remains static in length when operating, since the cylinders ride the cylinder shafts and compress the rubber sealers without the tool changing in length. This tool is also capable of testing various size pipe with the rubber sealers being effectively expandable for a larger range of pipe diameters, so that, in effect, a smaller tool which is capable of testing smaller standard size internal diameter pipe can also be used to effectively test pipe having larger internal diameters.

The rubber protectors may be replaced without special equipment and the tool may be used with grapple-type supports or cable-type supports and if the tool is to be used in certain orientations, such as below the rotary, the swab may be omitted and the lowermost socket 216 provided with a threaded plug to replace the entire swab shaft and maintain the socket 216 clean. Also, each threaded connection associated with the central pressure passageway is provided with an O-ring seal to prevent leakage from the central passageway. The over-all diameter of the tool is substantially constant throughout its length when the rubber sealers are not expanded with the rubber protectors at the tool head and tool foot and the rubber protector on the extension serving to protect the inside coating on the tubing or pipe from damage.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A tool for pressure testing tubing, casing, pipe, or other flow conductors, comprising a tool head with means at the upper end thereof for connection with an apparatus for raising and lowering the tool and means for supplying pressure fluid to the tool, a top sealing assembly supported from the tool head, a bottom sealing assembly spaced from the top sealing assembly, an extension interconnecting the top and bottom sealing assemblies, the tool head, sealing assemblies and extension having a passageway therethrough for conveying pressure fluid, said tool head, sealing assemblies and extension including a rigid interconnected relationship to maintain a fixed over-all length for the tool during operation of the sealing assemblies, each sealing assembly including a generally cylindrical resilient body capable of being longitudinally compressed and radially expanded to sealingly engage the interior of a tubing to be tested to form a test space, a longitudinally movable cylinder engaging one end of the compressible body, said cylinder being communicated with a pressure fluid passageway for longitudinal movement to compress the resilient body when pressure is introduced into the passageway, each sealing assembly also including a flow controller for discharging testing fluid pressure into the test space between the tool and tubing, said flow controller including a flow director and diffuser for precluding direct impingement of testing fluid against the inner surface of the tubing being tested thereby preserving a coating on the inner surface of the tubing being tested.

2. The structure as defined in claim 1 wherein said flow controller includes a rubber disk having a small orifice therein communicated with the passageway and forming a flow restriction whereby pressurized fluid will be provided with back pressure to expand the compressible body and then discharge pressurized fluid into the test space for testing the tubing for leaks.

3. The structure as defined in claim 1 together with a tool foot including a swab engageable with the interior of the tubing below the lower sealing assembly for precluding the flow of testing fluid downwardly into a well bore thereby preventing contamination of the "mud" and enabling reuse of the testing fluid thereby reducing the time necessary to fill void spaces during the testing operation.

4. The structure as defined in claim 1 wherein said tool includes a plurality of rubber protectors on the exterior thereof for preventing metal contact with a coating on the interior of the tubing being tested.

5. The structure as defined in claim 1 wherein said means on the tool head for connection with a raising and lowering apparatus includes a headed shank for connection with a grapple apparatus.

6. The structure as defined in claim 1 wherein said means on the tool head for connection with a raising and lowering apparatus includes a bail having means thereon receiving a cable-type apparatus.

7. In a tool for testing tubing, casing, pipe, or the like, for leaks of the type having a pair of spaced sealers for isolating a test space, that improvement comprising a flow controller including a pressure fluid passageway, a member having an orifice of predetermined size aligned with the passageway, and a flow director having an angulated passageway communicated with the orifice for precluding direct impingement of pressure fluid onto the interior surface of the test space.

8. The structure as defined in claim 7 wherein said flow director is disposed within a cavity in the tool, said cavity including an undercut chamber, said angulated passageway including opposed and offset discharge end portions for discharging test fluid into the chamber with a swirling action.

9. The structure as defined in claim 8 wherein said member having the orifice therein is a flexible resilient member having an orifice in the central portion thereof and being capable of being enlarged by distending the resilient member, said angulated passageway including a funnel-shaped end disposed adjacent the resilient member to receive the distended portion of the resilient member adjacent the orifice.

10. The structure as defined in claim 7 together with a swab mounted on the tool below the lower sealer, said swab comprising a flexible resilient hollow generally conical member having its apex disposed downwardly and the hollow outwardly flared base disposed upwardly and engaged with the interior of the tubing to prevent test fluid from flowing downhole from the testing tool.

11. In a tubing testing tool having spaced sealers for isolating a test space and means for introducing test fluid therebetween, that improvement comprising a tool foot at the bottom end of the tool in longitudinally spaced relation to the lower sealer, said tool foot including a swab engaged with the interior of the tubing for preventing test fluid from flowing downhole to prevent contamination of "mud" and enable a reuse of the test fluid, said swab including a flexible resilient, generally conical member having the base disposed upwardly for sliding engagement with the tubing.

12. A tool for pressure testing tubing, casing, pipe, or other flow conductors, comprising a tool head with means for connection with an apparatus for raising and lowering the tool and means for supplying pressure fluid to the tool, a top sealing assembly supported from the tool head, a bottom sealing assembly spaced from the top sealing assembly, an extension interconnecting the top and bottom sealing assemblies, said tool head, sealing assemblies and extension having a passageway therethrough for conveying pressure fluid, each sealing assembly including a generally cylindrical resilient body capable of being radially expanded to sealingly engage the interior of a tubing to be tested to form a test space, each sealing assembly also including fluid pressure actuated means to radially expand said resilient body, a flow controller communicating the fluid passageway and test space for discharging testing pressure fluid into the test space between the sealing assemblies on the tool, said flow controller including a flow restrictor means forming a back pressure whereby pressure fluid will actuate said means to radially expand the resilient bodies into sealing engagement with the interior of the tubing and then discharge pressure fluid into the test space for testing the tubing for leaks.

13. The structure as defined in claim 12 wherein said flow controller includes a flow director and difuser for directing pressure fluid discharged into the test space in a generally longitudinal direction thereby precluding direct impingement of testing fluid against an inner coated surface of the tubing being tested thereby preserving the coating.

14. The structure as defined in claim 12 wherein said flow restrictor means includes a resilient diaphragm having a small orifice therein, means mounting said diaphragm in peripherally spaced relation to the orifice to enable the diaphragm to be distended by pressure fluid for increasing the size of the orifice as the pressure of the pressure fluid increases with the resiliency of the diaphragm providing the back pressure to actuate the resilient body expanding means.

* * * * *